US010831556B2

United States Patent
Du et al.

(10) Patent No.: US 10,831,556 B2
(45) Date of Patent: Nov. 10, 2020

(54) VIRTUAL CPU CONSOLIDATION TO AVOID PHYSICAL CPU CONTENTION BETWEEN VIRTUAL MACHINES

(71) Applicant: Intel IP Corporation, Santa Clara, CA (US)

(72) Inventors: Yuyang Du, Beijing (CN); Jian Sun, Singapore (SG); Yong Tong Chua, Singapore (SG); Mingqiu Sun, Beaverton, OR (US); Sebastien Haezebrouck, Cannet (FR); Nicole Chalhoub, Valbonne (FR); Premanand Sakarda, Acton, MA (US); Richard Quinzio, Sophia Antipolis (FR)

(73) Assignee: Intel IP Corporation, Santa Clara, CA (US)

( * ) Notice: Subject to any disclaimer, the term of this patent is extended or adjusted under 35 U.S.C. 154(b) by 159 days.

(21) Appl. No.: 16/064,082

(22) PCT Filed: Dec. 23, 2015

(86) PCT No.: PCT/CN2015/098394
§ 371 (c)(1),
(2) Date: Jun. 20, 2018

(87) PCT Pub. No.: WO2017/107091
PCT Pub. Date: Jun. 29, 2017

(65) Prior Publication Data
US 2019/0004866 A1 Jan. 3, 2019

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01);
(Continued)

(58) Field of Classification Search
CPC .................................................... G06F 9/5077
See application file for complete search history.

(56) References Cited

U.S. PATENT DOCUMENTS

| 8,219,788 B1 * | 7/2012 | Cheng ..................... G06F 9/455 712/225 |
| 8,738,333 B1 * | 5/2014 | Behera .................. G06F 9/5061 703/2 |

(Continued)

FOREIGN PATENT DOCUMENTS

| CN | 102270159 A | 12/2011 |
| WO | WO-2015188649 A1 | 12/2015 |
| WO | WO-2017107091 A1 | 6/2017 |

OTHER PUBLICATIONS

"International Application Serial No. PCT/CN2015/098394, International Search Report dated Sep. 29, 2016", 4 pgs.

(Continued)

*Primary Examiner* — Sisley N Kim
(74) *Attorney, Agent, or Firm* — Schwegman Lundberg & Woessner, P.A.

(57) ABSTRACT

Various systems and methods for virtual CPU consolidation to avoid physical CPU contention between virtual machines are described herein. A processor system that includes multiple physical processors (PCPUs) includes a first virtual machine (VM) that includes multiple first virtual processors (VCPUs); a second VM that includes multiple second VCPUs; and a virtual machine monitor (VMM) to map individual ones of the first VCPUs to run on at least one of, individual PCPUs of a first subset of the PCPUs and individual PCPUs of a set of PCPUs that includes the first subset of the PCPUs and a second subset of the PCPUs, based at least in part upon compute capacity of the first subset of the PCPUs to run the first VCPUs, and to map
(Continued)

individual ones of the second VCPUs to run on individual ones of the second subset of the PCPUs.

25 Claims, 7 Drawing Sheets

(52) U.S. Cl.
CPC .... *G06F 9/5066* (2013.01); *G06F 2009/4557* (2013.01); *G06F 2009/45579* (2013.01)

(56) References Cited

U.S. PATENT DOCUMENTS

| | | |
|---|---|---|
| 2005/0132362 A1 | 6/2005 | Knauerhase |
| 2012/0278800 A1* | 11/2012 | Nicholas ............. G06F 9/45558 718/1 |
| 2014/0137108 A1 | 5/2014 | Tsirkin et al. |

OTHER PUBLICATIONS

"International Application Serial No. PCT/CN2015/098394, Written Opinion dated Sep. 29, 2016", 4 pgs.

* cited by examiner

VIRTUAL CPU CONSOLIDATION TO AVOID PHYSICAL CPU CONTENTION BETWEEN VIRTUAL MACHINES

This application is a U.S. National Stage Filing under 35 U.S.C. 371 from International Application No. PCT/CN2015/098394, filed on Dec. 23, 2015, and published as WO 2017/107091 on Jun. 29, 2017, which application is incorporated herein by reference in its entirety.

BACKGROUND

In a virtualized computing environment, a physical machine is configured to implement the behavior of the virtual machine. The physical machine, often referred to as a "host", can be configured using software to implement multiple virtual machines (VMs). A physical machine typically includes physical system hardware that typically includes one or more physical processors (PCPUs) and physical memory and various other physical devices, such as local storage and IO, for example. A virtual machine typically includes virtual system hardware that ordinarily includes one or more virtual CPUs (VCPUs), virtual memory, virtual storage, virtual IO, and one or more other virtual devices all of which may be implemented in software using known techniques to emulate corresponding physical components. A VM typically will include both virtual system hardware and guest system software including virtual drivers used for various virtual devices. One or more layers or co-resident software components comprising a virtualization intermediary, e.g. a virtual machine monitor (VMM), acts to instantiate and provision VMs and to allocate host machine resources dynamically and transparently among the multiple VMs so that their respective guest operating systems can each run multiple VCPUs concurrently on a single physical machine.

DESCRIPTION OF EMBODIMENTS

Figure 1:
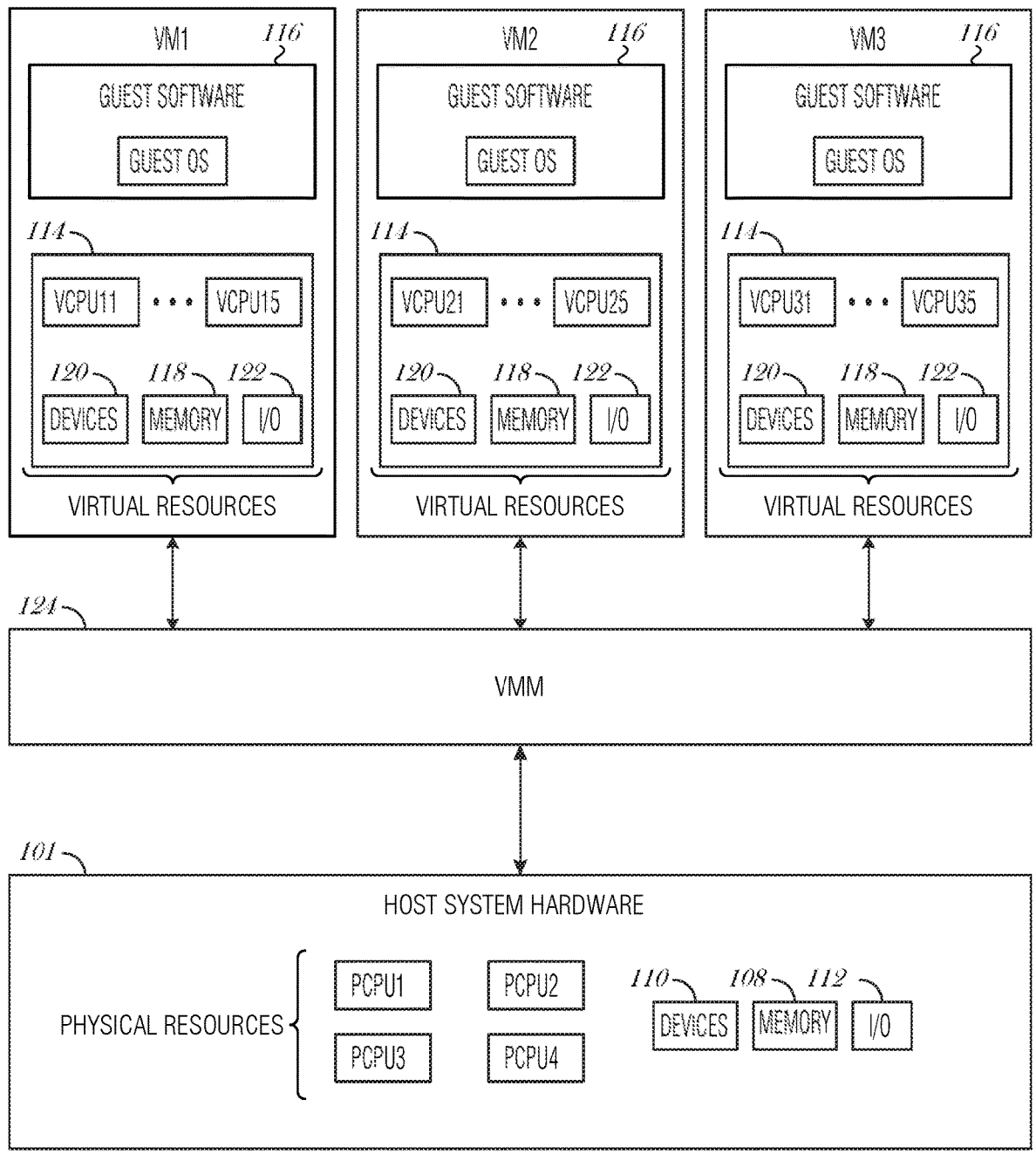
FIG. 1 is an illustrative block diagram of a multi-processor mobile device configured to host multiple virtual machines in accordance with some embodiments.

The following description is presented to enable any person skilled in the art to create and use a computer system configuration and related method and article of manufacture to consolidate virtual CPUs in a virtual machine monitor to avoid physical CPU contention between virtual machines. Various modifications to the embodiments will be readily apparent to those skilled in the art, and the generic principles defined herein may be applied to other embodiments and applications consistent with the disclosure. Moreover, in the following description, numerous details are set forth for the purpose of explanation. However, one of ordinary skill in the art will realize that the invention can be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. One or more computer systems may be configured to perform these processes. The flow diagrams include blocks that represent the configuration of a computer system according to computer program code to perform the acts described with reference to these blocks. Thus, the present invention is not intended to be limited to the embodiments shown, but is to be accorded the widest scope consistent with the principles and features disclosed herein.

FIG. 1 is an illustrative block diagram of a multi-processor mobile host device 100 configured to host multiple virtual machines in accordance with some embodiments. The example device 100 includes four physical processors (PCPUs), PCPU1 to PCPU4 and three virtual machines (VMs) VM1, VM2, VM3. Each VM includes multiple virtual processors (VCPUs). A virtual machine monitor (VMM) maps the VCPUs to run on the PCPUs.

The host device 100 such as a smartphone, for example, is configured to host the first, second and third virtual machines, VM1, VM2 and VM3. The physical device hardware 101 includes PCPU0 to PCPU4, memory 108, various other devices 110 and IO 112, for example. Each virtual machine VM1 to VM3 includes both virtual system hardware 114 and guest system software 116. Each virtual machine VM1 to VM3 includes multiple virtual VCPUs. A first VM1 includes VCPU11 to VCPU15. A second VM2 includes VCPU21 to VCPU25. A third VM3 includes VCPU31 to VCPU35. Each VM1 to VM3 also includes its own virtual memory 118, and its own one or more virtual devices 120 and virtual IO 122.

The host device 100 is configured to implement a virtual machine monitor (VMM) 124, which acts as an interface between the virtual machines VM1 to VM3 and the various physical hardware components and devices in the underlying hardware platform. The VMM 124 manages the selection of physical devices and their temporary assignment to virtual devices. For example, the VMM 124 manages the mapping between VM1 to VM3 and their VCPUs, and their virtual memories 118 and other virtual devices, and the physical hardware devices that are selected to implement these virtual devices. When a virtual processor (VCPU) is dispatched by a VM, a physical processor, such as one of the PCPUs, is mapped by the VMM 124 to perform the operations of that VCPU.

In accordance with some embodiments, VM1 implements an application that includes a visual user interface, VM2 implements modem communication protocol, and VM3 implements security. VM1 configures its VCPUs to use one or more PCPUs to implement an application such as a Windows or Android operating system, for example. VM2 configures its VCPUs to use one or more PCPUs to implement a wireless communication protocol such as the LTE communication protocol, for example. VM3 configures its VCPUs to use one or more PCPUs to implement a security protocol such as a DRM (digital rights management) protocol, for example. The three VMs, VM1 to VM3 run concurrently. In order to minimize virtualization overhead, the modem VM, VM2, and the security VM, VM3, are pinned to fixed PCPUs. Priority based scheduling is used to allocate VCPUs of the application VM, VM1, among all four PCPUs.

More specifically, communication VM, VM2, is pinned to a PCPU, PCPU3. The security VM, VM3, is pinned to a PCPU, PCPU4. The application VM, VM1 can share all four PCPUs, PCPU1 to PCPU4. In other words, the VCPUs used by the second (modem) VM, VM2, run only on PCPU3. The VCPUs used by the third (security) VM, VM3, run only on PCPU4. However, the VCPUs used by the first (application) VM, VM2, can run on any of, PCPU1 to PCPU4.

The VMM 124 maps VCPUs of the VMs to share the PCPUs based upon a prioritization in which the modem VM, VM2, has the highest priority; the security VM, VM3, has the next highest priority; and the application VM, VM1, has the lowest priority. In accordance with the scheduling process implemented by the VMM 124, when two VMs having different priorities are mapped to a PCPU so as to share the PCPU's processing resources, scheduling of a higher priority VM mapped to run on a PCPU preempts scheduling of a lower priority VM mapped to run on that same PCPU. Thus, for example, VM1, the application VM, which has the lowest priority, will be preempted from using a PCPU whenever either the modem VM, VM2, or the communication VM, VM3 competes for the same PCPU. As a result, when preempted, a victim application VCPU has to wait until a preempting modem VCPU or security VCPU is inactive for an arbitrarily long time.

In operation, the active time ratio of the modem VCPUs often is quite high. Moreover, when the modem VCPUs or security VCPUs are active, the application VCPUs often also are active because the application VM communicates with the modem VM or security VM. Furthermore, in some embodiments, a task scheduler in the application VMs generally attempts to evenly spread application VM workload across all VCPUs. As used herein, "workload" refers to active use of a PCPU resources to run VCPUs. As a consequence of this contention with the modem VM and the security VM, the application VM can suffer from serious performance and responsiveness issues because of the unbounded waiting while preempted by the modem VM or the security VM. With the modem VM handling higher and higher data rates, this problem is likely to become increasingly serious.

To mitigate the PCPU contention problem, the VMM 124 implements a process to consolidate the application VCPUs (VCPU11-VCPU15) to a dedicated subset of the host system PCPUs in response to a determination that a current application VCPU workload is within a prescribed range, indicating that the dedicated subset of PCPUs can effectively handle the application VCPU workload. Consolidation of the application VCPUs reduces preemption that results from contention between the application VCPUs and the modem and security VCPUs, since the application VCPUs run on dedicated subset of PCPUs on which the modem and security VCPUs do not run. Conversely, the VMM 124 implements a process to spread the application VCPUs (VCPU11-VCPU15) among a larger number of PCPUs in response to a determination that a current application VCPU workload is outside the prescribed range, indicating that the dedicated subset of PCPUs cannot effectively handle the application VCPU workload. Thus, when the application VCPU workload is too great to be handled by the dedicated subset of PCPUs, the application VCPUs are spread among a larger number of PCPUs. However, spreading the application VCPUs tasks or processes increase the chances of contention due to preemption since the application VCPUs are spread to PCPUs shared by the modem and security VCPUs. The prescribed range is selected so that during consolidation, the dedicated subset of PCPUs can handle the application VCPUs with no more than an acceptable level of degradation of user experience such as degradation of application's user interface (UI) performance due to slowness, for example. In accordance with some embodiments, a range is tunable. Thus, the prescribed range is selected to optimize a tradeoff between contention-free operation of the application VCPUs while the application VCPU workload is lighter and contention-impacted operation of the application VCPUs while the application VCPU workload is heavier.

Figure 2:
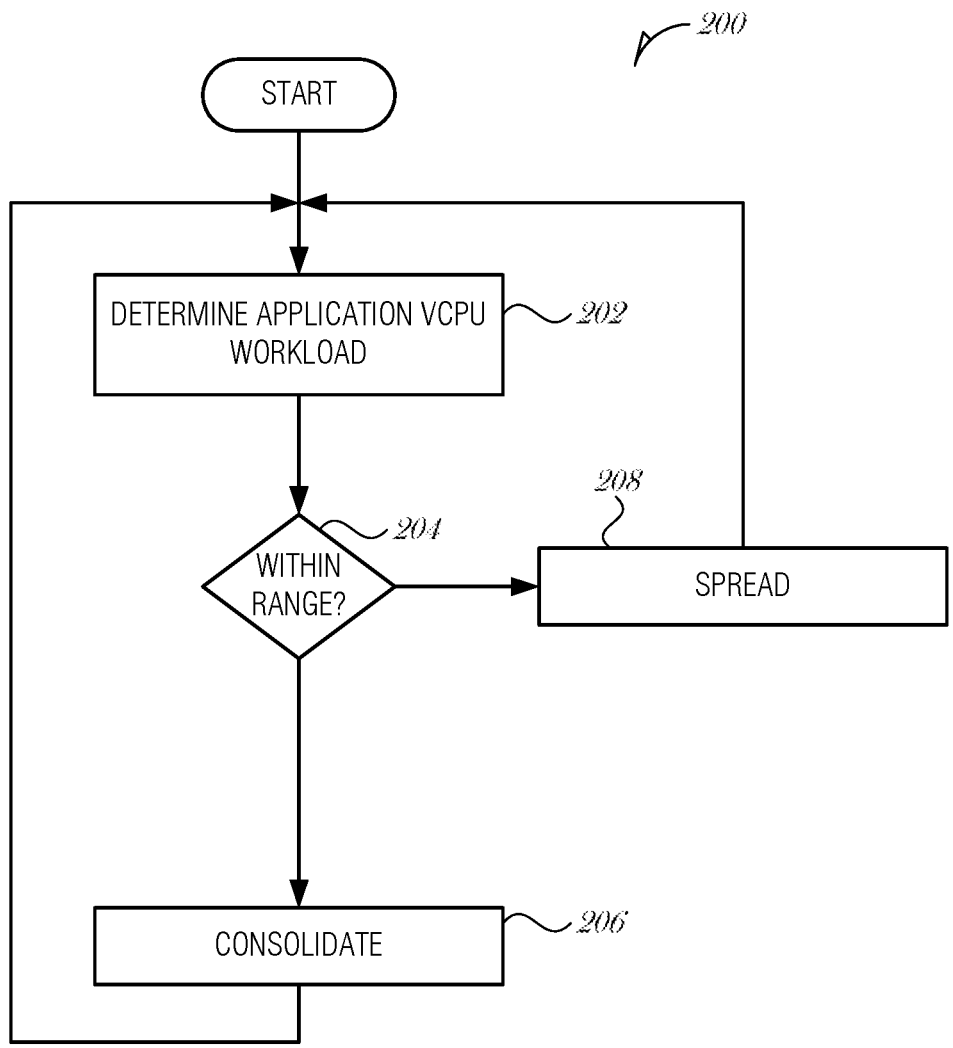
FIG. 2 is an illustrative flow diagram representing configuration of a VMM to manage application VCPU consolidation and spreading processes in accordance with some embodiments.

FIG. 2 is an illustrative flow diagram representing configuration of a VMM to manage application VCPU consolidation and spreading processes or tasks in accordance with some embodiments. More particularly, the illustrative flow diagram represents configuration of the VMM to perform a process 200 to consolidate application VCPUs to a smaller number of PCPUs and to spread application VCPUs among a larger number of PCPUs based upon application VCPU workload. Block 202 configures the VMM to determine a measure of application VCPU workload. In operation, multiple application VCPUs may run simultaneously on different PCPUs. The application VCPU workload provides a measure of the amount of PCPU compute resources allocated to running application VCPUs. The measure of application VM workload is continuously updated since the application VCPU workload can vary over time.

Block 204 configures the VMM to determine whether the VCPU workload measure indicates that the application VCPU workload is within a prescribed workload range. A selected subset of PCPUs in the host system, which may include one or more than one PCPU within the host system, is designated to act as a PCPUs dedicated to running the application VCPU during consolidation. In accordance with some embodiments, a dedicated first subset of PCPUs is selected that does not include PCPUs that run modem or security VCPUs that have higher priority than the application VCPUs. The prescribed workload range is selected based upon the compute capacity of the designated PCPUs. In some embodiments, the designated PCPU compute capacity is determined based at least in part upon the number of VCPUs that the designated PCPUs can run simultaneously without resulting in unacceptable degradation of application VM performance. In some embodiments, the prescribed workload range is demarcated using a threshold number of simultaneously running application VCPUs, a number of PCPUs in the first subset of PCPUs and a tunable scaling factor. Specifically, for a given number of PCPUs in the first subset and a given scaling factor, if the number of simultaneously running VCPUs is at or below a threshold number, then the application VCPU workload is determined to be within the prescribed range. Conversely, if the number of simultaneously running VCPUs is above threshold number, then the application VCPU workload is determined to be outside the prescribed range.

Block 206 configures the VMM to commence an application VCPU consolidation process in response to a determination that the application VCPU is within the prescribed range. The consolidation process involves changing the set of PCPUs on which application VCPUs run so as to only encompass PCPUs within the dedicated first subset of PCPUs and to not encompass PCPUs that are not within the dedicated first subset of PCPUs. Thus, consolidation results in application VCPUs running on a dedicated first subset of PCPUs on which there is no conflict with, and therefore, no preemption with modem or security VCPUs. Control next returns to block 202, which continues to monitor application VCPU workload.

Block 208 configures the VMM to commence an application VCPU spreading process in response to a determination that the application VCPU is outside the prescribed range. The spreading process involves changing the set of PCPUs on which application VCPUs run so as to encompass both PCPUs within the dedicated first subset of PCPUs and to encompass PCPUs that are outside the dedicated first subset to PCPUs. Spreading results in application VCPUs running on a larger number of PCPUs that have greater collective compute capacity to handle a larger application VCPU workload determined to be outside the prescribed range. It will be appreciated that spreading involves a tradeoff of increased likelihood of conflict with, and therefore, preemption by modem or security VCPUs. Control next returns to block 202, which continues to monitor application VCPU workload.

Figure 3:
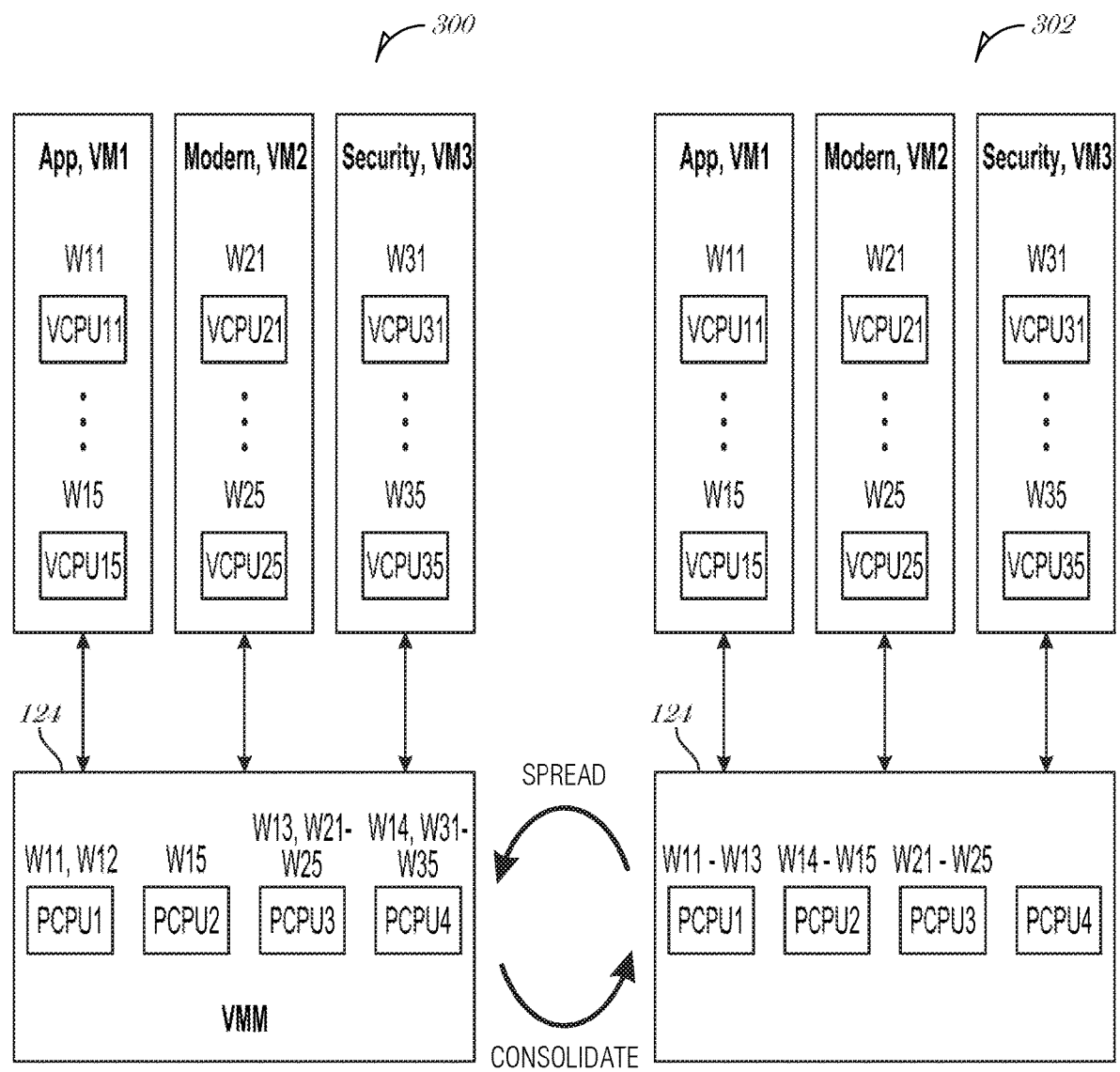
FIG. 3 is an illustrative block diagram showing an example of consolidation and spreading of application VCPUs within the host system of FIG. 1 in accordance with some embodiments.

FIG. 3 is an illustrative block diagram showing example mappings of VCPUs to PCPUs within the host system of FIG. 1 resulting from consolidation and spreading of application VCPUs in accordance with some embodiments. In the example, the application VM, VM1, has instantiated five application VCPUs, VCPU11 to VCPU15, which are respectively associated with application workloads W11 to W15. The modem VM, VM2, has instantiated five application VCPUs, VCPU21 to VCPU25, which are respectively associated with modem workloads W21 to W25. The security VM, VM3, has instantiated five application VCPUs, VCPU31 to VCPU35, which are respectively associated with workloads W31 to W35.

In this example, first and second PCPUs, PCPU1 and PCPU2 are selected to be dedicated to running application workloads associated with the application VCPUs. The modem VM, VM2, is pinned to a third PCPU, PCPU3, which runs all modem workloads associated with the modem VCPUs. The security VM, VM3, is pinned to a fourth PCPU, PCPU4, which runs all security workloads associated with the security VCPUs.

Two snapshots of the VMM 124 are shown. In a first (spreading) snapshot 300, the application workloads W11-W15 are spread among all four of the PCPUs, PCPU1 to PCPU4. Thus the PCPUs run mixed workloads. The third PCPU, PCPU3, runs both modem and application workloads (W13, W21-W25), and the fourth PCPU, PCPU4, runs both security and application workloads (W14, W31-W35). Since the third application workload W13 shares the third PCPU, PCPU3, with the five modem workloads W21-W25, the third application workload W13 is at risk of being preempted by one of more of the six modem workloads. Similarly, since the fourth application workload W14 shares the fourth PCPU, PCPU4, with the five security workloads W31-W35, the fourth application workload W14 is at risk of being preempted by one of more of the five security workloads. In a second (consolidating) snapshot 302, the application workloads (W11-W15) are consolidated to run only on the two PCPUs that are dedicated to running application workloads W11-W15 on the first and second PCPUs, PCPU1 and PCPU2. Thus, there is no risk that the application workloads will be preempted by the modem or security workloads.

Referring to FIGS. 2 and 3, assuming that workloads are allocated as shown in the first example snapshot (spreading) 300, in response to decision block 204 determining that the application VCPU workload is lighter and within the prescribed range, block 206 initiates the application VCPU consolidation process resulting in transition to the workload allocation shown in the second (consolidating) example snapshot 302. Conversely, assuming that workloads are allocated as shown in the second (consolidating) example snapshot 302, in response to decision block 204 determining that the application VCPU workload is outside the prescribed range, block 208 initiates the application VCPU spreading process resulting in transition to a workload allocation like that shown in the first (spreading) example snapshot 300. It will be appreciated that the application workload distribution may transition dynamically back and forth between consolidated application VCPU workload and spread out application VCPU workload in response to dynamic changes in overall application VCPU workload.

Figure 4:
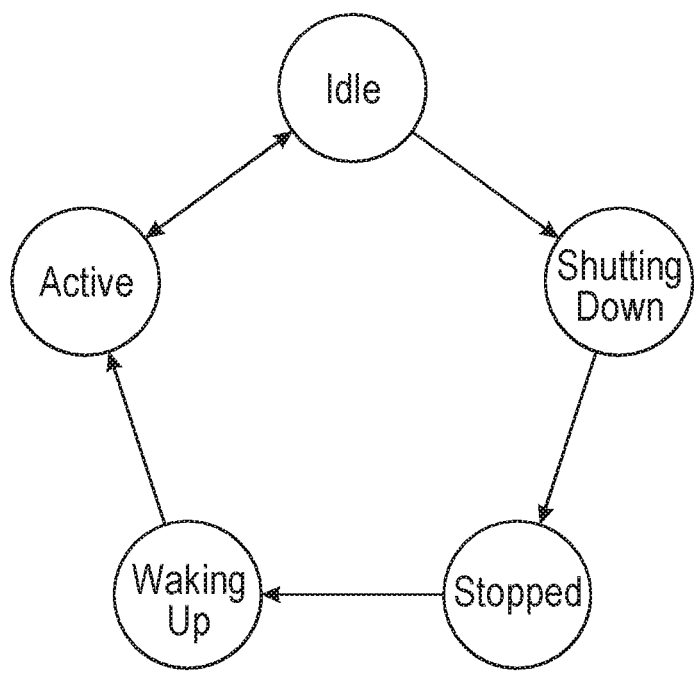
FIG. 4 is an illustrative state transition diagram representing state transitions of an application in accordance with some embodiments.

In order to determine whether the application VCPUs can be consolidated, the application VCPU workload is dynamically tracked. Application VCPU activity is monitored to determine when PCPUs are actively running application VCPU workloads. FIG. 4 is an illustrative state transition diagram representing state transitions of an application in accordance with some embodiments. During operation, the VMM, which runs VCPU workloads on PCPUs, transitions VCPU state at VM exit and entry points. A VCPU may transition as shown through multiple states. The states fall within two general categories: active (Active) and inactive (Idle, Waking up, Shutting down and Stopped).

Figure 5:
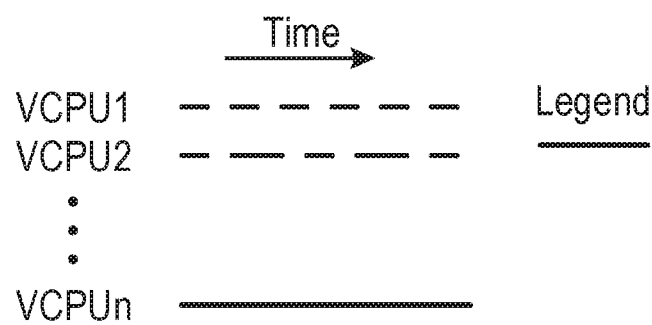
FIG. 5 is an illustrative example VCPU workload diagram indicating transitions of multiple application VCPUs between active and inactive states over a time interval in accordance with some embodiments.

FIG. 5 is an illustrative example VCPU workload diagram indicating transitions of multiple application VCPUs between active and inactive states over a time interval in accordance with some embodiments. As time elapses, each of n VCPUs transitions along a series of active and inactive states. The larger the number of simultaneously active application VCPUs at any given moment in time, the heavier the application VCPU workload at that moment in time.
Referring again to FIG. 2, block 202 configures the VMM to determine a continuously determine a current measure of application VCPU workload based upon the number of application VCPUs currently in an active state. The VMM is configured to count the number of the active application VCPUs (the application VCPUs that can run immediately) in real-time (let it be VCPUS). The VMM is configured to calculate an average active VCPU number during a period of time $T_p$:

$$ave = \frac{\sum_{i=1}^{n} VCPUs_i * t_i}{T_p}, \text{ where } \sum_{i=1}^{n} t_i = T_p$$

The VMM is configured to calculate a value for ave periodically at time intervals $t_i$, and to collect an infinite series of values representing the average number of active VCPUs in a series of past time periods, so as to obtain a time ordered series of values:

$ave_1, ave_2, ave_3, \ldots ave_{n-1}, ave_n$

An exponential decay is determined (using a decay factor, see below) for the averages after each time period, such that the older the period is, the less impact it has upon the final result, and a sum is determined based upon all the past decayed averages, to determine an averaged number of active application VCPUs per application VM based on their entire historical records:

$$AVE = \frac{1}{C} \sum_{j=1}^{m} f^{m-j} * ave_j$$

where the term AVE is the average number of active application VCPUs for the application VM, the term $ave_j$ is the average number of active VCPUs in the jth period, and f is the decaying factor, allowing a period's weight to be halved after h periods, i.e., $$f^h = \frac{1}{2}.$$

The parameter h allows us to control the decay speed. And C is a constant used to scale AVE into the same range as the number of active VCPUs $$\left( \text{i.e. } C = \lim_{m \to \infty} \sum_{j=1}^{m} f^{m-j} \right).$$

The value AVE acts as an application VCPU workload measure that is used as a prediction of how many application VCPUs are currently needed to run the workload in the application VM.

Still referring to FIG. 2, decision block 204 configures the VMM to use the application VCPU workload measure AVE to determine whether a first subset of PCPUs designated to run the application VCPUs have the compute capacity to handle the full VCPU workload. In accordance with some embodiments, determining whether the first subset of PCPUs has the compute capacity to handle the application VCPU workload involves determining whether the VCPU workload is within a prescribed workload range. More specifically, based on the determined current application VCPU workload AVE, decision block 204 makes a determination as to whether the m application VCPUs can be consolidated to n dedicated PCPUs for (m>n). In accordance with some embodiments, the following expression is evaluated to determine whether to consolidate or to spread application VCPUs:

$AVE \leq n * \text{consolidating\_coeff}$ where the term consolidating_coeff is a selectable threshold value that can be further tuned to be more or less aggressive.

In response to the above expression evaluated true, block 206 initiates the consolidation process to consolidate to the m application VCPUs to run on the n dedicated PCPUs. In response to the above expression evaluated not true, block 208 initiates the spreading process to spread the m applica-tion VCPUs to run on a larger number of PCPUs that extends beyond the n dedicated PCPUs.

Figure 6:
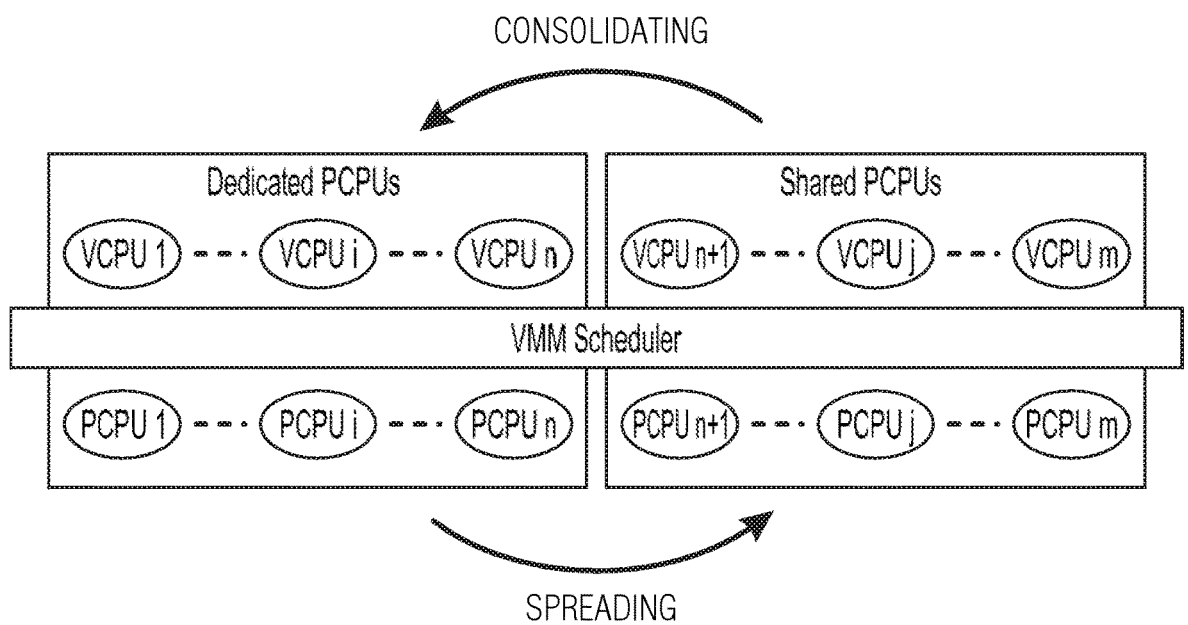
FIG. 6 is an illustrative drawing representing changes in associations among application VCPUs and PCPUs during the consolidation process and during the spreading process in accordance with some embodiments.

FIG. 6 is an illustrative drawing representing changes in associations among application VCPUs and PCPUs during the consolidation process (arrow pointing left) and during the spreading process (arrow pointing right) in accordance with some embodiments. The total number of PCPUs is m. The number of PCPUs in the first subset of PCPUs dedicated to running application VCPU workloads is n. During consolidation, the application VCPU workload is transitioned from being distributed among a set of (m-n) non-dedicated PCPUs to being consolidated to run on the n dedicated PCPUs. In other words, when the n PCPUs are determined to be capable of running the application VCPU workload, the (m-n) application VCPUs sharing PCPUs with the modem or security VCPUs will be gradually remaps to the dedicated n PCPUs. During spreading, the application VCPU workload is transitioned to be spread among the m PCPUs. As a result of spreading, the application VCPU workload will be spread more evenly across all the m PCPUs gradually, but in accordance with some embodiments, the VMM is configured to attempt to have heavier load on the n dedicated PCPUs than the other (m-n) shared PCPUs.

Referring again to FIG. 3, it will be appreciated that the VMM 124 maps application VCPUs (VCPU11-VCPU15) to a first subset of the PCPUs, PCPU1-PCPU2, during consolidation and can map the application VCPUs (VCPU11-VCPU15) to any of the four PCPUs, PCPU1-PCPU4, during spreading. The VMM 124 always maps the modem VCPUs (VCPU21-VCPU25) to a second subset of the PCPUs, PCPU3. The VMM 124 always maps the security VCPUs (VCPU31-VCPU35) to a third subset of the PCPUs, PCPU4. The first, second and third subsets do not overlap.

Figure 7:
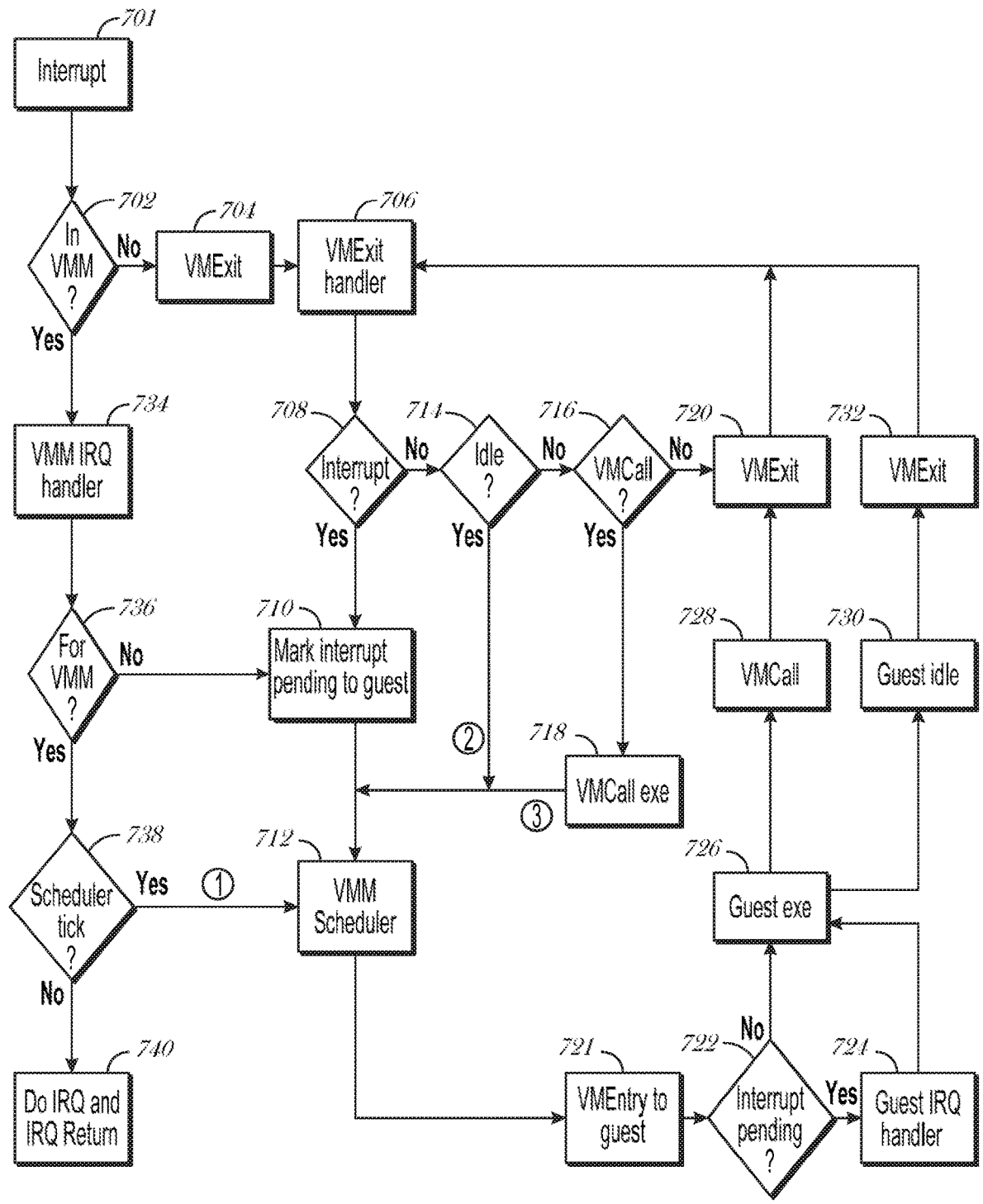
FIG. 7 is an illustrative flow diagram representing configuration of a VMM to map VM activities in accordance with some embodiments.

FIG. 7 is an illustrative flow diagram 700 representing configuration of a VMM to schedule VM activities in accordance with some embodiments. A right side of the flow diagram represents a virtual machine control loop. The VMM receives an interrupt 701 from a PCPU is running one or more VCPU workloads. In response to a receipt of an interrupt, decision block 702 determines whether the interrupt is within the VMM. If it is not, then a VMExit block 704 sends the interrupt to a VMExit handler block 706, which sends the interrupt to decision block 708, which determines whether there is an interrupt for the VM. If yes, block 710 delivers the interrupt to the guest operating system running in the virtual machine, and control next flows to a VMM scheduler block 712. If no, decision block 714 determines whether a PCPU running a VCPU is currently idle. If yes, control flows to the VMM scheduler block 712. If no, decision block 716 determines whether the virtual machine is making a call to the PCPU hardware. If yes, block 718 executes, and control flows to the VMM scheduler block 710. If no, control flows to VMExit block 720. The VMM scheduler block determines whether to reschedule one or more VCPUs of the VM to run on a different PCPU.

Following operation of the VMM scheduler block, control flows to VMEntry block 721 to restart the control loop by giving control to the guest OS. It will be appreciated that the VMM scheduler may remap a VM's VCPU to run on a different PCPU. Decision block 722 determines whether there is a pending interrupt. If yes, guest OS block 724 handles the interrupt using a guest interrupt handler. If no or following handling the interrupt, guest block continues executes a next instruction. Control next flows to a VM call block 728 or to a guest idle block 730 depending upon the guest instruction executed. Following those blocks, control returns to the VMExit block 720 or to VMExit block 732, respectively.

In response to decision block 702 determining that a received interrupt is within the VMM, interrupt handler block 734 directs the interrupt to decision block 736, which determines whether the interrupt is directed to the VMM. If no, then the interrupt is delivered to block 710. If yes, then decision block 738 determines whether a remapping timer indicates that it is time for a VMM to evaluate VM mapping. If yes, then control flows to the VMM scheduler block 712. If no, then control flows to an IRQ return block 740.

The VMM scheduler block 712 determines whether to remap a VCPU running on a PCPU to instead run on a different PCPU. In general, remapping occurs to achieve load balancing, for example. However, in accordance with some embodiments the consolidation and spreading processes are implemented using the VMM scheduler block 712. The VMM scheduling block 712 is configured to remap application VCPUs to consolidate VCPUs to the dedicated PCPUs in response to decision block 204 determining that the application VCPU workload is within the prescribed range, and to not seek consolidation and to instead allow spreading of application VCPUs to PCPUs other than the dedicated PCPUs in response to a determination that the application VCPU workload is outside the prescribed range.

During consolidation, which generally occurs during lighter application VCPU workload, a remapping timer associated with the VMM scheduler block 712 periodically preempts current execution of one or more application VCPUs in a guest VM to remap one or more application VCPUs to run on one or more dedicated PCPUs if the preempted PCPU is not one of the dedicated PCPU. Also during consolidation, the VMM scheduler block 712 is configured to determine whether an idle PCPU is one of the dedicated PCPUs, and if yes, to prioritize remapping to it an application VCPU from one of the non-dedicated PCPUs. On the other hand, if the idle PCPU is one of the non-dedicated PCPUs then no application VCPU is transferred to it. In addition, during consolidation, block 718 may be configured such that a call to a guest OS results in the guest cooperatively allowing the guest OS to indicate whether or not there is a need to consolidate an application VCPU.

During spreading, which generally occurs during heavier application VCPU workload, the remapping timer associated with the VMM scheduler block 712 periodically preempts current execution of one or more application VCPUs in a guest VM to remap one or more application VCPUs to run on one or more non-dedicated PCPUs if the preempted PCPU is a dedicated PCPU. Also during spreading, the VMM scheduler block 712 is configured to determine whether an idle PCPU is one of the non-dedicated PCPUs, and if yes, to prioritize remapping to it an application VCPU from one of the dedicated PCPUs. On the other hand, if the idle PCPU is one of the dedicated PCPUs then no application VCPU is transferred to it. Additionally during spreading, block 718 may be configured such that a call to a guest OS results in the guest cooperatively allowing the guest OS to indicate whether or not there is a need to consolidate an application VCPU.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
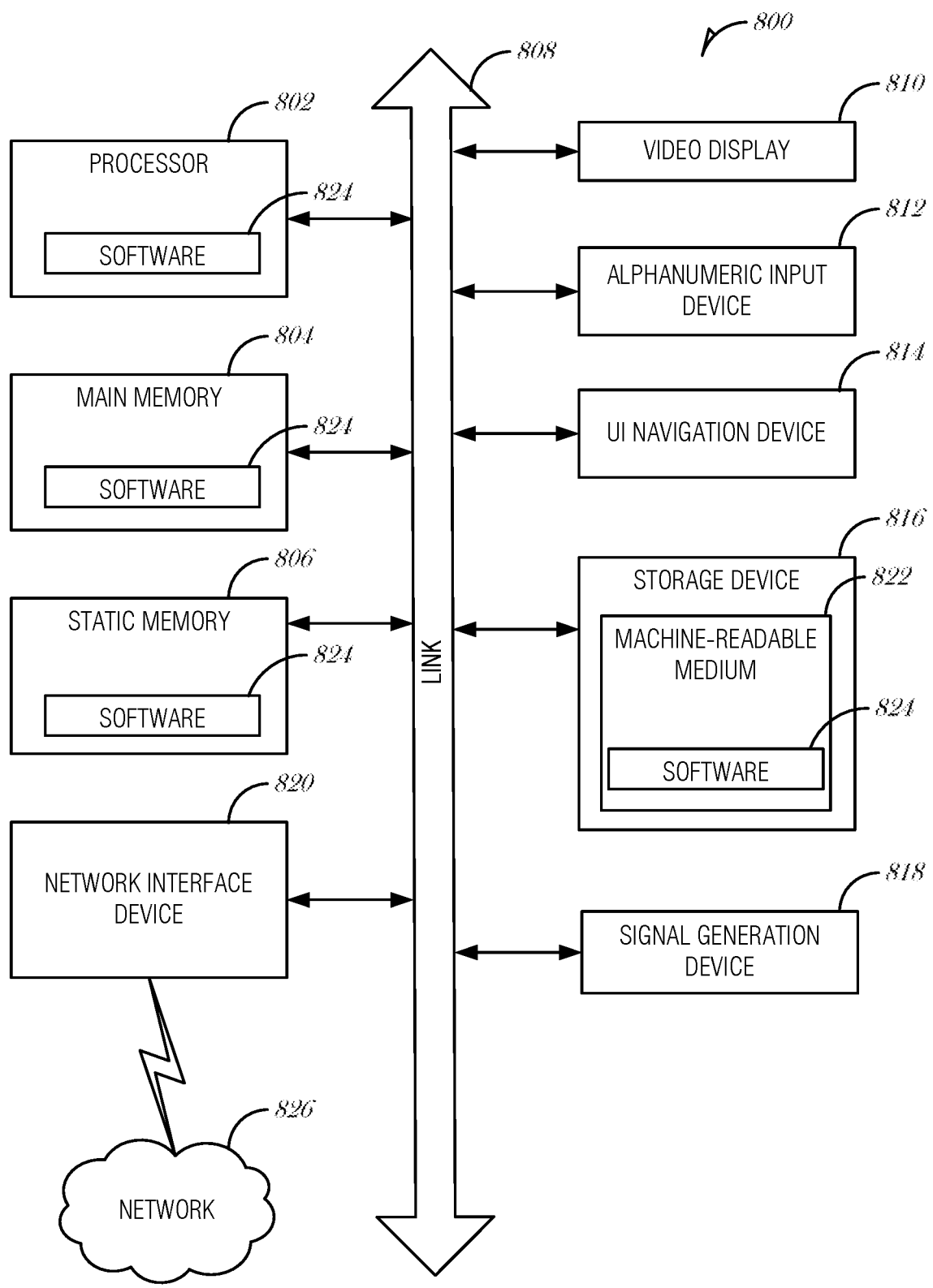
FIG. 8 is an illustrative block diagram representing a machine, upon which any one or more of the techniques (e.g., methodologies) discussed herein may perform, in accordance with some embodiments.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a phablet, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a processor system that includes multiple physical processors (PCPUs) comprising: a first virtual machine (VM) that includes multiple first virtual processors (VCPUs); a second VM that includes multiple second VCPUs; and a virtual machine monitor (VMM) to map individual ones of the first VCPUs to run on at least one of, individual PCPUs of a first subset of the PCPUs and individual PCPUs of a set of PCPUs that includes the first subset of the PCPUs and a second subset of the PCPUs, based at least in part upon compute capacity of the first subset of the PCPUs to run the first VCPUs, and to map individual ones of the second VCPUs to run on individual ones of the second subset of the PCPUs.

In Example 2, the subject matter of Example 1 optionally includes, wherein the VMM determines the compute capacity of the first subset of the PCPUs to run the first VCPUs based at least in part upon workload of the first VCPUs.

In Example 3, the subject matter of any one or more of Examples 1-2 optionally include, wherein the VMM determines work load of the first VCPUs and determines the compute capacity of the first subset of the PCPUs to run the first VCPUs based at least in part upon the determined workload of the first VCPUs.

In Example 4, the subject matter of any one or more of Examples 1-3 optionally include, wherein the VMM determines a workload of the first VCPUs based at least in part upon a determination of a number of first VCPUs in an active state during at least one time interval and to determine the compute capacity of the first subset of the PCPUs to run the first VCPUs based at least in part upon the determined workload of the first VCPUs.

In Example 5, the subject matter of any one or more of Examples 1-4 optionally include, wherein the VMM remaps individual first VCPUs to individual ones of the first subset of the PCPUs in response to the workload of the first VCPUs within a prescribed range; and wherein the VMM remaps individual first VCPUs to individual ones of the set that includes the first and second subsets of the PCPUs in response to the workload of the first VCPUs outside a prescribed range.

In Example 6, the subject matter of any one or more of Examples 1-5 optionally include, wherein the VMM remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range.

In Example 7, the subject matter of any one or more of Examples 1-6 optionally include, wherein the VMM remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

In Example 8, the subject matter of any one or more of Examples 1-7 optionally include, wherein the VMM remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range; and wherein the VMM remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

In Example 9, the subject matter of any one or more of Examples 1-8 optionally include, wherein the VMM determines a workload of the first VCPUs based at least in part upon a determination of a number of first VCPUs in an active state during at least one time interval.

In Example 10, the subject matter of any one or more of Examples 1-9 optionally include, wherein the VMM determines a workload of the first VCPUs based at least in part upon a determination of a number of first VCPUs in an active state during at least one time interval and to determine a threshold based at least in part upon a number of PCPUs in the first subset of the PCPUs.

In Example 11, the subject matter of any one or more of Examples 1-10 optionally include, wherein the VMM periodically interrupts execution of each first VCPU and remaps one or more of the periodically interrupted first VCPUs that runs on a PCPU from the set that includes the first and second subsets of PCPUs to a PCPU from the first subset of the PCPUs in response to the workload of the first VCPUs within the prescribed range.

In Example 12, the subject matter of any one or more of Examples 1-11 optionally include, wherein the VMM prioritizes remapping a first VCPU that currently runs on a PCPU from the set that includes the first and second subsets of PCPUs to an idle PCPU within the first subset of the PCPUs in response to the workload of the first VCPUs within the prescribed range.

In Example 13, the subject matter of any one or more of Examples 1-12 optionally include, wherein the VMM periodically interrupts execution of each first VCPU; wherein the VMM remaps one or more of the periodically interrupted first VCPUs that runs on a PCPU from the set that includes the first and second subsets of PCPUs to a PCPU from the first subset of the PCPUs in response to the workload of the first VCPUs within the prescribed range; and wherein the VMM prioritizes remapping a first VCPU that currently runs on a PCPU from the set that includes the first and second subsets of PCPUs to an idle PCPU within the first subset of the PCPUs in response to the workload of the first VCPUs within the prescribed range.

In Example 14, the subject matter of any one or more of Examples 1-13 optionally include, wherein the VMM prioritizes remapping a first VCPU currently running on a PCPU from the set that includes the first and second subsets of the PCPUs to an idle PCPU within the first subset of the PCPUs in response to the workload of the first VCPUs within the prescribed range; and wherein the VMM prioritizes remapping a first VCPU currently running on a PCPU from the first subset of the PCPUs to an idle PCPU within the set that includes the first and second subsets of the PCPUs in response to the workload of the first VCPUs outside the prescribed range.

In Example 15, the subject matter of any one or more of Examples 1-14 optionally include, wherein the first VM is associated with a first priority value and the second VM is associated with a second priority value that is higher than the first priority value; wherein the VMMs prioritizes scheduling running of the first and second VCPUs based upon the associated priority values associated with the first and second VMs.

Example 16 is a host system comprising: m physical processors (PCPUs); a first virtual machine (VM) that includes multiple first virtual processors (VCPUs) that are associated with a first priority; a second VM that includes multiple second VCPUs that are associated with a second priority higher than the first priority; and a virtual machine monitor (VMM) to, map the first VCPUs to run on PCPUs of a set of PCPUs that includes the m PCPUs, wherein mapping the first VCPUs includes one of consolidating mapping of the first VCPUs to run on PCPUs of a first subset of the m PCPUs that contains n PCPUs and spreading mapping of the first VCPUs to run on PCPUs of a set that includes the m PCPUs, based at least in part upon compute capacity of the n PCPUs to run the first VCPUs; map the second VCPUs to a second subset of the m PCPUs that includes m-n PCPUs that are not included in the first subset of the m PCPUs; and prioritize scheduling running of first VCPUs and second VCPUs that are mapped to run on shared PCPUs, based upon their associated priorities.

In Example 17, the subject matter of Example 16 optionally includes, wherein the VMM remaps individual first VCPUs to individual ones of the of the first subset of the m PCPUs in response to the workload of the first VCPUs within a prescribed range; and wherein the VMM remaps individual first VCPUs to individual ones of the set that includes the m PCPUs in response to the workload of the first VCPUs outside a prescribed range.

In Example 18, the subject matter of any one or more of Examples 16-17 optionally include, wherein the VMM determines a workload of the first VCPUs based at least in part upon a determination of a number of first VCPUs in an active state during at least one time interval; and wherein the VMM determines the compute capacity of the n PCPUs to run the first VCPUs based at least in part upon the determined workload and the number n of PCPUs in the first subset of the m PCPUs.

In Example 19, the subject matter of any one or more of Examples 16-18 optionally include, wherein the VMM determines a workload of the first VCPUs based at least in part upon a determination of an average number of first VCPUs in an active state during a time interval; and wherein the VMM determines the compute capacity of the n PCPUs to run the first VCPUs based at least in part upon the determined workload and the number n of PCPUs in the first subset of the m PCPUs.

In Example 20, the subject matter of any one or more of Examples 16-19 optionally include, wherein the VMM determines a workload of the first VCPUs based at least in part upon a determination of average numbers of first VCPUs in an active state during each of multiple time intervals in which average numbers determined for more recent time intervals are weighted more heavily than average numbers for less recent time intervals; and wherein the VMM determines the compute capacity of the n PCPUs to run the first VCPUs based at least in part upon the determined workload and the number n of PCPUs in the first subset of the m PCPUs.

In Example 21, the subject matter of any one or more of Examples 16-20 optionally include, wherein the first VM includes guest software to implement an application that includes a user interface; and wherein the second VM includes guest software to implement a modem.

In Example 22, the subject matter of any one or more of Examples 16-21 optionally include further including: a third virtual machine that includes multiple third VCPUs that are associated with a third priority higher than the first priority; wherein the VMM to, map the third VCPUs to a third subset of the m PCPUs that includes m-n PCPUs that are not included in the first subset of the m PCPUs and that are not included in the second subset of the m PCPUs; prioritize scheduling running of first VCPUs and second VCPUs that are mapped to run on shared PCPUs, based upon their associated priorities; and prioritize scheduling running of first VCPUs and third VCPUs that are mapped to run on shared PCPUs, based upon their associated priorities.

Example 23 is a host system comprising: m physical processors (PCPUs); a first virtual machine (VM) that includes multiple first virtual processors (VCPUs) that are associated with a first priority; a second VM that includes multiple second VCPUs that are associated with a second priority higher than the first priority; a third virtual machine that includes multiple third VCPUs that are associated with a third priority higher than the first priority; and a virtual machine monitor (VMM) to, map the first VCPUs to run on PCPUs of a set of PCPUs that includes the m PCPUs, wherein mapping the first VCPUs includes one of consolidating mapping of the first VCPUs to run on PCPUs of a first subset of the m PCPUs that contains n PCPUs and spreading mapping of the first VCPUs to run on PCPUs of a set that includes the m PCPUs, based at least in part upon compute capacity of the n PCPUs to run the first VCPUs; map the second VCPUs to a second subset of the m PCPUs that includes m-n PCPUs that are not included in the first subset of the m PCPUs; map the third VCPUs to a third subset of the m PCPUs that includes m-n PCPUs that are not included in the first subset of the m PCPUs and that are not included in the second subset of the m PCPUs; determine work load of the first VCPUs and determine the compute capacity of the PCPUs to run the first VCPUs based at least in part upon the determined workload of the first VCPUs; prioritize scheduling running of first VCPUs and second VCPUs that are mapped to run on shared PCPUs, based upon their associated priorities; and prioritize scheduling running of first VCPUs and third VCPUs that are mapped to run on shared PCPUs, based upon their associated priorities.

In Example 24, the subject matter of Example 23 optionally includes, wherein the VMM determines a workload of the first VCPUs based at least in part upon a determination of a number of first VCPUs in an active state during at least one time interval; and wherein the VMM determines the compute capacity of the n PCPUs to run the first VCPUs based at least in part upon the determined workload and the number n of PCPUs in the first subset of the m PCPUs.

Example 25 is a method for use in a host system to map virtual processors (VCPUs) to physical processors (PCPUs) comprising: providing a first virtual machine (VM) that includes multiple first VCPUs; providing a second VM that includes multiple second VCPUs; and individually mapping individual ones of the first VCPUs to run on at least one of individual physical processors (PCPUs) of a set that includes one or more first PCPUs and individual PCPUs of a set that includes the one or more first PCPUs and one or more second PCPUs, based at least in part upon compute capacity of the set that includes the one or more first PCPUs to run the first VCPUs, and to map individual ones of the second VCPUs to run on individual ones of the set of one or more second PCPUs.

In Example 26, the subject matter of Example 25 optionally includes, wherein the VMM determines the compute capacity of the PCPUs to run the first VCPUs based at least in part upon workload of the first VCPUs.

In Example 27, the subject matter of any one or more of Examples 25-26 optionally include, wherein the VMM determines work load of the first VCPUs and determines the compute capacity of the PCPUs to run the first VCPUs based at least in part upon the determined workload of the first VCPUs.

In Example 28, the subject matter of any one or more of Examples 25-27 optionally include, wherein the VMM determines a workload of the first VCPUs based at least in part upon a determination of a number of first VCPUs in an active state during at least one time interval and to determine the compute capacity of the PCPUs to run the first VCPUs based at least in part upon the determined workload of the first VCPUs.

In Example 29, the subject matter of any one or more of Examples 25-28 optionally include further including: remapping individual first VCPUs to individual ones of the set of one or more first PCPUs in response to the workload of the first VCPUs within a prescribed range; and remapping individual first VCPUs to individual ones of the set of one or more second PCPUs in response to the workload of the first VCPUs outside a prescribed range.

In Example 30, the subject matter of any one or more of Examples 25-29 optionally include, further including: remapping one or more first VCPUs currently running on individual ones of the set of one or more second PCPUs to individual ones of the set of first PCPUs to consolidate their mappings to the set of one or more first PCPUs in response to the workload of the first VCPUs within a prescribed range.

In Example 31, the subject matter of any one or more of Examples 25-30 optionally include, further including: remapping one or more first VCPUs currently running on individual ones of the set of one or more first PCPUs to individual ones of the set of second PCPUs to evenly spread their mappings among the set of one or more first PCPUs and the set of one or more second PCPUs in response to the workload of the first VCPUs outside the prescribed range.

In Example 32, the subject matter of any one or more of Examples 25-31 optionally include, further including: remapping one or more first VCPUs currently running on individual ones of the set of one or more second PCPUs to individual ones of the set of first PCPUs to consolidate their mappings to the set of one or more first PCPUs in response to the workload of the first VCPUs within a prescribed range; and remapping one or more first VCPUs currently running on individual ones of the set of one or more first PCPUs to individual ones of the set of second PCPUs to evenly spread their mappings among the set of one or more first PCPUs and the set of one or more second PCPUs in response to the workload of the first VCPUs outside the prescribed range.

In Example 33, the subject matter of any one or more of Examples 25-32 optionally include, further including: determining a workload of the first VCPUs based at least in part upon a determination of a number of first VCPUs in an active state during at least one time interval.

In Example 34, the subject matter of any one or more of Examples 25-33 optionally include, further including: determining a workload of the first VCPUs based at least in part upon a determination of a number of first VCPUs in an active state during at least one time interval and to determine a threshold based at least in part upon a number of PCPUs in the set of one or more first PCPUs.

In Example 35, the subject matter of any one or more of Examples 25-34 optionally include, further including: periodically interrupting execution of each first VCPU and to remap one or more of the periodically interrupted first VCPUs that runs on a PCPU from the set of one or more second PCPUs to a PCPU from the first set of PCPUs in response to the workload of the first VCPUs within the prescribed range.

In Example 36, the subject matter of any one or more of Examples 25-35 optionally include, further including: prioritizing remapping a first VCPU from the set of one or more second PCPUs to an idle PCPU within the set of one or more first PCPUs in response to the workload of the first VCPUs within the prescribed range.

In Example 37, the subject matter of any one or more of Examples 25-36 optionally include, further including: periodically interrupting execution of each first VCPU; remapping one or more of the periodically interrupted first VCPUs that runs on a PCPU from the set of one or more second PCPUs to a PCPU from the first set of PCPUs in response to the workload of the first VCPUs within the prescribed range; and remapping one or more of the periodically interrupted first VCPUs that runs on a PCPU from the set of one or more first PCPUs to a PCPU from the second set of PCPUs in response to the workload of the first VCPUs outside the prescribed range.

In Example 38, the subject matter of any one or more of Examples 25-37 optionally include, further including: prioritizing remapping a first VCPU currently running on a PCPU from the set of one or more second PCPUs to an idle PCPU within the set of one or more first PCPUs in response to the workload of the first VCPUs within the prescribed range; and prioritizing remapping a first VCPU currently running on a PCPU from the set of one or more first PCPUs to an idle PCPU within the set of one or more second PCPUs in response to the workload of the first VCPUs outside the prescribed range.

Example 39 is a machine-readable medium including instructions, which when executed by a computing system, cause the computing system to perform any of the methods of Examples 25 to 38.

Example 40 is an apparatus comprising means for performing any of the methods of Examples 25 to 38.

Example 41 is a method to map virtual processors (VCPUs) to physical processors (PCPUs) in a host system that includes m PCPUs, comprising: providing a first virtual machine (VM) that includes multiple first virtual processors (VCPUs) that are associated with a first priority; providing a second VM that includes multiple second VCPUs that are associated with a second priority higher than the first priority; and mapping the first VCPUs to run on PCPUs of a set of PCPUs that includes the m PCPUs, wherein mapping the first VCPUs includes one of consolidating mapping of the first VCPUs to run on PCPUs of a first subset of the m PCPUs that contains n PCPUs and spreading mapping of the first VCPUs to run on PCPUs of a set that includes the m PCPUs, based at least in part upon compute capacity of the n PCPUs to run the first VCPUs; mapping the second VCPUs to a second subset of the m PCPUs that includes m-n PCPUs that are not included in the first subset of the m PCPUs; and prioritizing scheduling running of first VCPUs and second VCPUs that are mapped to run on shared PCPUs, based upon their associated priorities.

In Example 42, the subject matter of Example 41 optionally includes, further including: remapping individual first VCPUs to individual ones of the of the first subset of the m PCPUs in response to the workload of the first VCPUs within a prescribed range; and remapping individual first VCPUs to individual ones of the set that includes the m PCPUs in response to the workload of the first VCPUs outside a prescribed range.

In Example 43, the subject matter of any one or more of Examples 41-42 optionally include, further including: determining a workload of the first VCPUs based at least in part upon a determination of a number of first VCPUs in an active state during at least one time interval; and determining the compute capacity of the n PCPUs to run the first VCPUs based at least in part upon the determined workload and the number n of PCPUs in the first subset of the m PCPUs.

In Example 44, the subject matter of any one or more of Examples 41-43 optionally include, further including: determining a workload of the first VCPUs based at least in part upon a determination of an average number of first VCPUs in an active state during a time interval; and determining the compute capacity of the n PCPUs to run the first VCPUs based at least in part upon the determined workload and the number n of PCPUs in the first subset of the m PCPUs.

In Example 45, the subject matter of any one or more of Examples 41-44 optionally include, further including: determining a workload of the first VCPUs based at least in part upon a determination of average numbers of first VCPUs in an active state during each of multiple time intervals in which average numbers determined for more recent time intervals are weighted more heavily than average numbers for less recent time intervals; and determining the compute capacity of the n PCPUs to run the first VCPUs based at least in part upon the determined workload and the number n of PCPUs in the first subset of the m PCPUs.

Example 46 is a machine-readable medium including instructions, which when executed by a computing system, cause the computing system to perform any of the methods of Examples 41 to 45.

Example 47 is an apparatus comprising means for performing any of the methods of Examples 41 to 45.

Example 48 is a processor system that includes multiple physical processors (PCPUs) comprising: a first virtual machine (VM) that includes multiple first virtual processors (VCPUs); a second VM that includes multiple second VCPUs; and a virtual machine monitor (VMM) means to map individual ones of the first VCPUs to run on at least one of, individual PCPUs of a first subset of the PCPUs and individual PCPUs of a set of PCPUs that includes the first subset of the PCPUs and a second subset of the PCPUs, based at least in part upon compute capacity of the first subset of the PCPUs to run the first VCPUs, and to map individual ones of the second VCPUs to run on individual ones of the second subset of the PCPUs.

In Example 49, the subject matter of Example 48 optionally includes, wherein the VMM means determines the compute capacity of the first subset of the PCPUs to run the first VCPUs based at least in part upon workload of the first VCPUs.

In Example 50, the subject matter of any one or more of Examples 48-49 optionally include, wherein the VMM means determines work load of the first VCPUs and determines the compute capacity of the first subset of the PCPUs to run the first VCPUs based at least in part upon the determined workload of the first VCPUs.

In Example 51, the subject matter of any one or more of Examples 48-50 optionally include, wherein the VMM means determines a workload of the first VCPUs based at least in part upon a determination of a number of first VCPUs in an active state during at least one time interval and to determine the compute capacity of the first subset of the PCPUs to run the first VCPUs based at least in part upon the determined workload of the first VCPUs.

In Example 52, the subject matter of any one or more of Examples 48-51 optionally include, wherein the VMM means remaps individual first VCPUs to individual ones of the first subset of the PCPUs in response to the workload of the first VCPUs within a prescribed range; and wherein the VMM means remaps individual first VCPUs to individual ones of the set that includes the first and second subsets of the PCPUs in response to the workload of the first VCPUs outside a prescribed range.

In Example 53, the subject matter of any one or more of Examples 48-52 optionally include, wherein the VMM means remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range.

In Example 54, the subject matter of any one or more of Examples 48-53 optionally include, wherein the VMM means remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

In Example 55, the subject matter of any one or more of Examples 48-54 optionally include, wherein the VMM means remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range; and wherein the VMM means remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

In Example 56, the subject matter of any one or more of Examples 48-55 optionally include, wherein the VMM means determines a workload of the first VCPUs based at least in part upon a determination of a number of first VCPUs in an active state during at least one time interval.

In Example 57, the subject matter of any one or more of Examples 48-56 optionally include, wherein the VMM means determines a workload of the first VCPUs based at least in part upon a determination of a number of first VCPUs in an active state during at least one time interval and to determine a threshold based at least in part upon a number of PCPUs in the first subset of the PCPUs.

In Example 58, the subject matter of any one or more of Examples 48-57 optionally include, wherein the VMM means periodically interrupts execution of each first VCPU and remaps one or more of the periodically interrupted first VCPUs that runs on a PCPU from the set that includes the first and second subsets of PCPUs to a PCPU from the first subset of the PCPUs in response to the workload of the first VCPUs within the prescribed range.

In Example 59, the subject matter of any one or more of Examples 48-58 optionally include, wherein the VMM means prioritizes remapping a first VCPU that currently runs on a PCPU from the set that includes the first and second subsets of PCPUs to an idle PCPU within the first subset of the PCPUs in response to the workload of the first VCPUs within the prescribed range.

In Example 60, the subject matter of any one or more of Examples 48-59 optionally include, wherein the VMM means periodically interrupts execution of each first VCPU; wherein the VMM means remaps one or more of the periodically interrupted first VCPUs that runs on a PCPU from the set that includes the first and second subsets of PCPUs to a PCPU from the first subset of the PCPUs in response to the workload of the first VCPUs within the prescribed range; and wherein the VMM means prioritizes remapping a first VCPU that currently runs on a PCPU from the set that includes the first and second subsets of PCPUs to an idle PCPU within the first subset of the PCPUs in response to the workload of the first VCPUs within the prescribed range.

In Example 61, the subject matter of any one or more of Examples 48-60 optionally include, wherein the VMM means prioritizes remapping a first VCPU currently running on a PCPU from the set that includes the first and second subsets of the PCPUs to an idle PCPU within the first subset of the PCPUs in response to the workload of the first VCPUs within the prescribed range; and wherein the VMM means prioritizes remapping a first VCPU currently running on a PCPU from the first subset of the PCPUs to an idle PCPU within the set that includes the first and second subsets of the PCPUs in response to the workload of the first VCPUs outside the prescribed range.

In Example 62, the subject matter of any one or more of Examples 48-61 optionally include, wherein the first VM is associated with a first priority value and the second VM is associated with a second priority value that is higher than the first priority value; wherein the VMM means s prioritizes scheduling running of the first and second VCPUs based upon the associated priority values associated with the first and second VMs.

Example 63 is a host system comprising: m physical processors (PCPUs); a first virtual machine (VM) that includes multiple first virtual processors (VCPUs) that are associated with a first priority; a second VM that includes multiple second VCPUs that are associated with a second priority higher than the first priority; and a virtual machine monitor (VMM) means to, map the first VCPUs to run on PCPUs of a set of PCPUs that includes the m PCPUs, wherein mapping the first VCPUs includes one of consolidating mapping of the first VCPUs to run on PCPUs of a first subset of the m PCPUs that contains n PCPUs and spreading mapping of the first VCPUs to run on PCPUs of a set that includes the m PCPUs, based at least in part upon compute capacity of the n PCPUs to run the first VCPUs; map the second VCPUs to a second subset of the m PCPUs that includes m-n PCPUs that are not included in the first subset of the m PCPUs; and prioritize scheduling running of first VCPUs and second VCPUs that are mapped to run on shared PCPUs, based upon their associated priorities.

In Example 64, the subject matter of Example 63 optionally includes, wherein the VMM means remaps individual first VCPUs to individual ones of the of the first subset of the m PCPUs in response to the workload of the first VCPUs within a prescribed range; and wherein the VMM means remaps individual first VCPUs to individual ones of the set that includes the m PCPUs in response to the workload of the first VCPUs outside a prescribed range.

In Example 65, the subject matter of any one or more of Examples 63-64 optionally include, wherein the VMM means determines a workload of the first VCPUs based at least in part upon a determination of a number of first VCPUs in an active state during at least one time interval; and wherein the VMM means determines the compute capacity of the n PCPUs to run the first VCPUs based at least in part upon the determined workload and the number n of PCPUs in the first subset of the m PCPUs.

In Example 66, the subject matter of any one or more of Examples 63-65 optionally include, wherein the VMM means determines a workload of the first VCPUs based at least in part upon a determination of an average number of first VCPUs in an active state during a time interval; and wherein the VMM means determines the compute capacity of the n PCPUs to run the first VCPUs based at least in part upon the determined workload and the number n of PCPUs in the first subset of the m PCPUs.

In Example 67, the subject matter of any one or more of Examples 63-66 optionally include, wherein the VMM means determines a workload of the first VCPUs based at least in part upon a determination of average numbers of first VCPUs in an active state during each of multiple time intervals in which average numbers determined for more recent time intervals are weighted more heavily than average numbers for less recent time intervals; and wherein the VMM means determines the compute capacity of the n PCPUs to run the first VCPUs based at least in part upon the determined workload and the number n of PCPUs in the first subset of the m PCPUs.

In Example 68, the subject matter of any one or more of Examples 63-67 optionally include, wherein the first VM includes guest software to implement an application that includes a user interface; and wherein the second VM includes guest software to implement a modem.

In Example 69, the subject matter of any one or more of Examples 63-68 optionally include further including: a third virtual machine that includes multiple third VCPUs that are associated with a third priority higher than the first priority; wherein the VMM means is to, map the third VCPUs to a third subset of the m PCPUs that includes m-n PCPUs that are not included in the first subset of the m PCPUs and that are not included in the second subset of the m PCPUs; prioritize scheduling running of first VCPUs and second VCPUs that are mapped to run on shared PCPUs, based upon their associated priorities; and prioritize scheduling running of first VCPUs and third VCPUs that are mapped to run on shared PCPUs, based upon their associated priorities.

Example 70 is a host system comprising: m physical processors (PCPUs); a first virtual machine (VM) that includes multiple first virtual processors (VCPUs) that are associated with a first priority; a second VM that includes multiple second VCPUs that are associated with a second priority higher than the first priority; a third virtual machine that includes multiple third VCPUs that are associated with a third priority higher than the first priority; and a virtual machine monitor (VMM) means to, map the first VCPUs to run on PCPUs of a set of PCPUs that includes the m PCPUs, wherein mapping the first VCPUs includes one of consolidating mapping of the first VCPUs to run on PCPUs of a first subset of the m PCPUs that contains n PCPUs and spreading mapping of the first VCPUs to run on PCPUs of a set that includes the m PCPUs, based at least in part upon compute capacity of the n PCPUs to run the first VCPUs; map the second VCPUs to a second subset of the m PCPUs that includes m-n PCPUs that are not included in the first subset of the m PCPUs; map the third VCPUs to a third subset of the m PCPUs that includes m-n PCPUs that are not included in the first subset of the m PCPUs and that are not included in the second subset of the m PCPUs; determine work load of the first VCPUs and determine the compute capacity of the PCPUs to run the first VCPUs based at least in part upon the determined workload of the first VCPUs; prioritize scheduling running of first VCPUs and second VCPUs that are mapped to run on shared PCPUs, based upon their associated priorities; and prioritize scheduling running of first VCPUs and third VCPUs that are mapped to run on shared PCPUs, based upon their associated priorities.

In Example 71, the subject matter of Example 70 optionally includes, wherein the VMM means determines a workload of the first VCPUs based at least in part upon a determination of a number of first VCPUs in an active state during at least one time interval; and wherein the VMM means determines the compute capacity of the n PCPUs to run the first VCPUs based at least in part upon the determined workload and the number n of PCPUs in the first subset of the m PCPUs.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A processor system that includes multiple physical processors (PCPUs) comprising:
 a first virtual machine (VM) that includes multiple first virtual processors (VCPUs);
 a second VM that includes multiple second VCPUs; and
 a virtual machine monitor (VMM) to map individual ones of the first VCPUs to run on at least one of, individual PCPUs of a first subset of the PCPUs and individual PCPUs of a set of PCPUs that includes the first subset of the PCPUs and a second subset of the PCPUs, based at least in part upon compute capacity of the first subset of the PCPUs to run the first VCPUs, and to map individual ones of the second VCPUs to run on individual ones of the second subset of the PCPUs,
 wherein the VMM calculates an average number of first VCPUs during an interval, incorporates the average number of first VCPUs in a running average number of first VCPUs during each of multiple time intervals in which the average number of first VCPUs determined for a first time interval is weighted differently than the average number of first VCPUs for a second time interval, and moves at least one VCPU from a first PCPU to a second PCPU based on the running average number of first VCPUs.

2. The system of claim 1, wherein the VMM determines the compute capacity of the first, subset of the PCPUs to run the first VCPUs based at least in part upon workload of the first VCPUs.

3. The system of claim 1, wherein the VMM determines work load of the first VCPUs and determines the compute capacity of the first subset of the PCPUs to run the first VCPUs based at least in part upon the determined workload of the first VCPUs.

4. The system of claim 1, wherein the VMM determines a workload of the first VCPUs based at least in part upon a determination of a number of first VCPUs in an active state during at least one time interval and to determine the compute capacity of the first subset of the PCPUs to run the first VCPUs based at least in part upon the determined workload of the first VCPUs.

5. The system of claim 1, wherein the VMM remaps individual first VCPUs to individual ones of the first subset of the PCPUs in response to the workload of the first VCPUs within a prescribed range; and wherein the VMM remaps individual first VCPUs to individual ones of the set that includes the first and second subsets of the PCPUs in response to the workload of the first VCPUs outside a prescribed range.

6. The system of claim 1, wherein the VMM remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range.

7. The system of claim 1, wherein the VMM remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

8. The system of claim 1,
 wherein the VMM remaps one or more first VCPUs currently running on individual ones of the set that includes the first and second subsets of the PCPUs to individual PCPUs of first subset of the PCPUs to consolidate their mappings to the first subset of the PCPUs in response to the workload of the first VCPUs within a prescribed range; and
 wherein the VMM remaps one or more first VCPUs currently running on individual ones of the first subset of the PCPUs to individual PCPUs of the set that includes the first and second subsets of the PCPUs to spread their mappings among the set that includes the first and second subsets of the PCPUs in response to the workload of the first VCPUs outside the prescribed range.

9. The system of claim 1,
 wherein the VMM determines a workload of the first VCPUs based at least in part upon a determination of a number of first VCPUs in an active state during at least one time interval.

10. The system of claim 1, wherein the VMM determines a workload of the first VCPUs based at least in part upon a determination of a number of first VCPUs in an active state during at least one time interval and to determine a threshold based at least in part upon a number of PCPUs in the first subset of the PCPUs.

11. The system of claim 1, wherein the VMM periodically interrupts execution of each first VCPU and remaps one or more of the periodically interrupted first VCPUs that runs on a PCPU from the set that includes the first and second subsets of PCPUs to a PCPU from the first subset of the PCPUs in response to the workload of the first VCPUs within the prescribed range.

12. The system of claim 1, wherein the VMM prioritizes recapping a first VCPU that currently runs on a PCPU from the set that includes the first and second subsets of PCPUs to an idle PCPU within the first subset of the PCPUs in response to the workload of the first VCPUs within the prescribed range.

13. The system of claim 1,
 wherein the VMM periodically interrupts execution of each first VCPU;
 wherein the VMM remaps one or more of the periodically interrupted first VCPUs that runs on a PCPU from the set that includes the first and second subsets of PCPUs to a PCPU from the first subset of the PCPUs in response to the workload of the first VCPUs within the prescribed range; and
 wherein the VMM prioritizes remapping a first VCPU that currently runs on a PCPU from the set that includes the first and second subsets of PCPUs to an idle PCPU within the first subset of the PCPUs in response to the workload of the first VCPUs within the prescribed range.

14. The system of claim 1,
 wherein the VMM prioritizes remapping a first VCPU currently running on a PCPU from the set that includes the first and second subsets of the PCPUs to an idle PCPU within the first subset of the PCPUs in response to the workload of the first VCPUs within the prescribed range; and wherein the VMM prioritizes remapping a first VCPU currently running on a PCPU from the first subset of the PCPUs to an idle PCPU within the set that includes the first and second subsets of the PCPUs in response to the workload of the first VCPUs outside the prescribed range.

15. The system of claim 1,
wherein the first VM is associated with a first priority value and the second VM is associated with a second priority value that is higher than the first priority value;
wherein the VMM prioritizes scheduling running of the first and second VCPUs based upon the associated priority values associated with the first and second VMs.

16. A method for use in a host system to map virtual processors (VCPUs) to physical processors (PCPUs) comprising:
providing a first virtual machine (VM) that includes multiple first VCPUs;
providing a second VM that includes multiple second VCPUs;
individually mapping individual ones of the first VCPUs to run on at least one of individual physical processors (PCPUs) of a set that includes one or more first PCPUs and individual PCPUs of a set that includes the one or more first PCPUs and one or more second PCPUs, based at least in part upon compute capacity of the set that includes the one or more first PCPUs to run the first VCPUs, and to map individual ones of the second VCPUs to run on individual ones of the set of one or more second PCPUs;
calculating an average number of first VCPUs during an interval;
incorporating the average number of first VCPUs in a running average number of first VCPUs during each of multiple time intervals in which the average number of first VCPUs determined for a first time interval is weighted differently than the average number of first VCPUs for a second time interval; and
moving at least one VCPU from a first PCPU to a second PCPU based on the running average number of first VCPUs.

17. The method of claim 16, wherein the VMM determines the compute capacity of the PCPUs to run the first VCPUs based at least in part upon workload of the first VCPUs.

18. The method of claim 16, wherein the VMM determines work load of the first VCPUs and determines the compute capacity of the PCPUs to run the first VCPUs based at least in part upon the determined workload of the first VCPUs.

19. The method of claim 16, wherein the VMM determines a workload of the first VCPUs based at least in part upon a determination of a number of first VCPUs in an active state during at least one time interval and to determine the compute capacity of the PCPUs to run the first VCPUs based at least in part upon the determined workload of the first VCPUs.

20. The method of claim 16, further including:
remapping individual first VCPUs to individual ones of the set of one or more first PCPUs in response to the workload of the first VCPUs within a prescribed range; and
remapping individual first VCPUs to individual ones of the set of one or more second PCPUs in response to the workload of the first VCPUs outside a prescribed range.

21. The method of claim 16, further including:
remapping one or more first VCPUs currently running on individual ones of the set of one or more second PCPUs to individual ones of the set of first PCPUs to consolidate their mappings to the set of one or more first PCPUs in response to the workload of the first VCPUs within a prescribed range.

22. The method of claim 16, further including:
remapping one or more first VCPUs currently running on individual ones of the set of one or more first PCPUs to individual ones of the set of second PCPUs to evenly spread their mappings among the set of one or more first PCPUs and the set of one or more second PCPUs in response to the workload of the first VCPUs outside the prescribed range.

23. The method of claim 16, further including:
remapping one or more first VCPUs currently running on individual ones of the set of one or more second PCPUs to individual ones of the set of first PCPUs to consolidate their mappings to the set of one or more first PCPUs in response to the workload of the first VCPUs within a prescribed range; and
remapping one or more first VCPUs currently running on individual ones of the set of one or more first PCPUs to individual ones of the set, of second PCPUs to evenly spread their mappings among the set of one or more first PCPUs and the set of one or more second PCPUs in response to the workload of the first VCPUs outside the prescribed range.

24. The method of claim 16, further including:
determining a workload of the first VCPUs based at least in part upon a determination of a number of first VCPUs in an active state during at least one time interval.

25. The method of claim 16, further including:
determining a workload of the first VCPUs based at least in part upon a determination of a number of first VCPUs in an active state during at least one time interval and to determine a threshold based at least in part upon a number of PCPUs in the set of one or more first PCPUs.

* * * * *

UNITED STATES PATENT AND TRADEMARK OFFICE
CERTIFICATE OF CORRECTION

PATENT NO. : 10,831,556 B2
APPLICATION NO. : 16/064082
DATED : November 10, 2020
INVENTOR(S) : Du et al.

Page 1 of 1

It is certified that error appears in the above-identified patent and that said Letters Patent is hereby corrected as shown below:

In the Claims

In Column 23, Line 36, in Claim 2, delete "first," and insert --first-- therefor In Column 24, Line 41, in Claim 12, delete "recapping" and insert --remapping-- therefor In Column 26, Line 37, in Claim 23, delete "set," and insert --set-- therefor Signed and Sealed this
Sixteenth Day of February, 2021

Drew Hirshfeld
*Performing the Functions and Duties of the
Under Secretary of Commerce for Intellectual Property and
Director of the United States Patent and Trademark Office*